US010423561B2

(12) United States Patent
So et al.

(10) Patent No.: US 10,423,561 B2
(45) Date of Patent: Sep. 24, 2019

(54) COMPUTING DEVICES WITH HOT SWAPPING PREDICTION CIRCUITS

(71) Applicant: Hewlett-Packard Development Company, L.P., Houston, TX (US)

(72) Inventors: Chi So, Houston, TX (US); Nam H Nguyen, Houston, TX (US); Ted T Nguy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,814

(22) PCT Filed: Jul. 13, 2016

(86) PCT No.: PCT/US2016/042050
§ 371 (c)(1),
(2) Date: Oct. 30, 2018

(87) PCT Pub. No.: WO2018/013102
PCT Pub. Date: Jan. 18, 2018

(65) Prior Publication Data
US 2019/0138485 A1 May 9, 2019

(51) Int. Cl.
*G06F 13/40* (2006.01)
*G06F 1/16* (2006.01)
(Continued)

(52) U.S. Cl.
CPC ........ *G06F 13/4081* (2013.01); *G06F 1/1684* (2013.01); *G06F 1/1694* (2013.01);
(Continued)

(58) Field of Classification Search
CPC ........ G06F 1/1694; G06F 1/266; G06F 1/325; G06F 1/3287; G06F 13/4081; G06F 1/1684; G06F 1/26
See application file for complete search history.

(56) References Cited

U.S. PATENT DOCUMENTS 6,185,645 B1 2/2001 Klein et al.
7,135,971 B2 11/2006 Kim
(Continued)

FOREIGN PATENT DOCUMENTS

| JP | 5134035 | 1/2013 |
|---|---|---|
| TW | 200739094 A | 10/2007 |
| TW | 201446073 A | 12/2014 |

OTHER PUBLICATIONS

Hot Plug Detect Issues on Monitors, Oct. 16, 2012, https://www.google.co.in/url?sa=t&rct=j&q=&esrc=s&source=web&cd=1&cad=rja&uact=8&.

*Primary Examiner* — Nimesh G Patel
(74) *Attorney, Agent, or Firm* — HP Inc. Patent Department

(57) ABSTRACT

An example computing device includes a module interface to communicate with a peripheral device. The computing device also includes a hot swapping prediction circuit to detect a physical movement of the computing device and to generate a hot swapping prediction signal based on the detected physical movement. The computing device further includes a processor coupled to the hot swapping circuit. The processor is to, in response to detecting the hot swapping prediction signal from the hot swapping circuit, change a parameter of a peripheral device detection operation to be executed by an operating system of the computing device.

16 Claims, 4 Drawing Sheets

(51) Int. Cl.
*G06F 1/26* (2006.01)
*G06F 1/3234* (2019.01)
*G06F 1/3287* (2019.01)

(52) U.S. Cl.
CPC .............. *G06F 1/26* (2013.01); *G06F 1/266* (2013.01); *G06F 1/325* (2013.01); *G06F 1/3287* (2013.01); *G06F 2200/1637* (2013.01); *G06F 2213/0042* (2013.01)

(56) References Cited

U.S. PATENT DOCUMENTS

| | | | |
|---|---|---|---|
| 7,782,201 B2 * | 8/2010 | Weksler | H04M 1/72527 340/539.1 |
| 8,266,359 B2 | 9/2012 | Chan | |
| 8,996,776 B2 | 3/2015 | Wong | |
| 9,015,505 B2 * | 4/2015 | Tabone | G06F 1/3203 713/320 |
| 2005/0149651 A1 * | 7/2005 | Doak | G06F 13/387 710/52 |
| 2010/0223408 A1 * | 9/2010 | Souders | G06F 1/266 710/104 |
| 2010/0241889 A1 * | 9/2010 | Fu | G06F 1/3209 713/324 |
| 2013/0346640 A1 * | 12/2013 | Gui | G06F 13/10 710/14 |
| 2015/0098542 A1 | 4/2015 | Yi et al. | |
| 2015/0293812 A1 * | 10/2015 | Roberts | G11C 29/04 714/764 |
| 2018/0123385 A1 * | 5/2018 | Akiyama | H02J 9/005 |

\* cited by examiner

COMPUTING DEVICES WITH HOT SWAPPING PREDICTION CIRCUITS

BACKGROUND

Some computing systems support hot swapping of hardware components. Hot swapping includes hot plug and hot unplug of a hardware component Hot plug is the ability to add a hardware component to the computing system while the computing system is powered on. Hot unplug is the ability to remove a connected hardware component from the computing system while the computing system is powered on.

BRIEF DESCRIPTION OF THE DRAWINGS

Some examples of the present application are described with respect to the following figures.

DETAILED DESCRIPTION

Some computing systems may support hot swapping of a hardware component. However, a hot swapping of hardware component may cause problems that affect the user experience and/or the performance of the computing system. For example, sparks may appear when a high powered hardware component is hot swapped. As another example, the hardware component may suffer from physical damage when hot swapped.

Examples described herein provide a computing device with a hot swapping prediction circuit to perform an operation with a peripheral device in response to a prediction that the peripheral device is to be hot swapped. For example, a computing device may include a module interface to communicate with a peripheral device. The computing device may also include a hot swapping prediction circuit to detect a physical movement of the computing device and to generate a hot swapping prediction signal based on the detected physical movement. The computing device may further include a processor coupled to the hot swapping circuit. In response to receiving the hot swapping prediction signal from the hot swapping circuit, the processor may change a parameter of a peripheral device detection operation to be executed by an operating system of the computing device, perform a power operation associated with the peripheral device, and/or perform a data operation associated with the peripheral device. In this manner, examples described herein may reduce problems associated with hot swapping of hardware component, such as a peripheral device.

Figure 1:
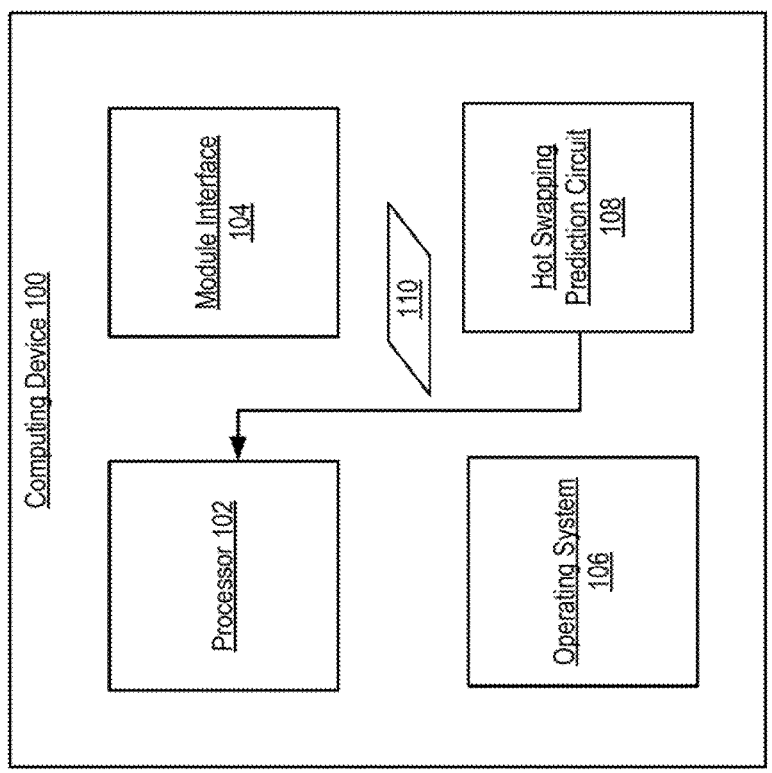
FIG. 1 illustrates a computing device to change a parameter of a peripheral device detection operation in response to detecting a hot swapping prediction signal from a hot swapping prediction circuit, according to an example.

FIG. 1 illustrates a computing device 100 to perform an operation with a coupled peripheral device in response to receiving a hot swapping prediction signal from a hot swapping prediction circuit, according to an example. Computing device 100 may be, for example, a notebook computer, a desktop computer, an all-in-one system, a tablet computing device, a mobile phone, or any other electronic device suitable to couple to a peripheral device. As used herein, a peripheral device may be any device that provides an additional functionality to computing device 100. For example, a peripheral device may be a data storage device, such as a hard disk drive. As another example, a peripheral device may provide audio and/or video functionality, such as a speaker, a camera, etc. As another example, a peripheral device be an optical disk drive, such as a DVD drive.

Computing device 100 may include a processor 102, a module interface 104, an operating system (OS) 106 implemented using instructions executable by processor 102, and a hot swapping prediction circuit 108. Processor 102 may be a central processing unit (CPU), a semiconductor-based microprocessor, and/or other hardware devices suitable to control operations of computing device 100. Module interface 104 may be a connector to enable computing device 100 to provide power to a peripheral device (not shown in FIG. 1) and also to communicate with the peripheral device. In an example, module interface 104 may be implemented as a Universal Serial Bus (USB) type-c connector.

Operating system 106 may an application that controls the operations of computing device 100. The application may be implemented using instructions executable by processor 102. Hot swapping prediction circuit 108 may detect a physical movement of computing device 100, such as computing device 100 being picked up by a user. Hot swapping prediction circuit 108 may generate a hot swapping prediction signal 110 in response to the detected physical movement. Hot swapping prediction signal 110 may be generated in a format that is detectable by processor 102. In an example, hot swapping prediction signal 110 may be implemented as an electrical voltage. In another example, hot swapping prediction signal 110 may be implemented as a digital signal. In an example, hot swapping prediction circuit 108 may be implemented using an accelerometer. In other examples, hot swapping prediction circuit 108 may be implemented using any circuit or device that measures an acceleration of computing device 100.

Module interface 104 may be located at a lower side of computing device 100. A user of computing device 100 may pick up or lift computing device 100 to expose module interface 104 so that computing device 100 may be coupled to a peripheral device via module interface 104. Similarly, when computing device 100 is already coupled to a peripheral device, the user may pick up or lift computing device 100 to remove the peripheral device from module interface 104 or to plug another peripheral device to the peripheral device so that computing device 100 may be coupled to two peripheral devices. Thus, the detected physical movement of computing device 100 may indicate an upcoming hot swapping of a peripheral device.

During operation, in response to detecting hot swapping prediction signal 110, processor 102 may instruct operating system 106 to change a parameter of a device detection operation that is to be performed by operating system 106. During the device detection operation, operating system 106 may attempt to communicate with the peripheral device via module interface 104 to discover different information about a peripheral device (e.g., a function of the peripheral device, a power consumption threshold of the peripheral device, a manufacturer of the peripheral device, etc.). When operating system 106 fails to communicate with the peripheral device, operating system 106 may generate an error message to inform a user of computing device 100 that the device detection operation has failed.

The device detection operation may include a parameter that controls an amount of attempts that operating system 106 is to undertake to discover the information about the peripheral device before generating an error message. For example, the default value of the parameter may be 1 attempt. That means operation system 106 is to generate the error message when operating system 106 fails to discover the information about the peripheral device after 1 attempt. In response to detecting hot swapping prediction signal 110, processor 102 may instruct operating system 106 to change the parameter from 1 attempt to 3 attempts. Thus, when operating system 106 performs the device detection operation, operating system 106 may generate the error message after 3 unsuccessful attempts to discover the information about the peripheral device. It should be understood that the parameter can be changed to any number of attempts.

By increasing the amount of attempts before generating the error message, there is an increased amount of time for a peripheral device to power up all internal components when hot plugging into computing device 100. Thus, when the peripheral device is fully powered on, the peripheral device can properly transmit information requested during the device detection operation to operating system 106. Thus, the likelihood of a failed device detection operation may be reduced.

Figure 2:
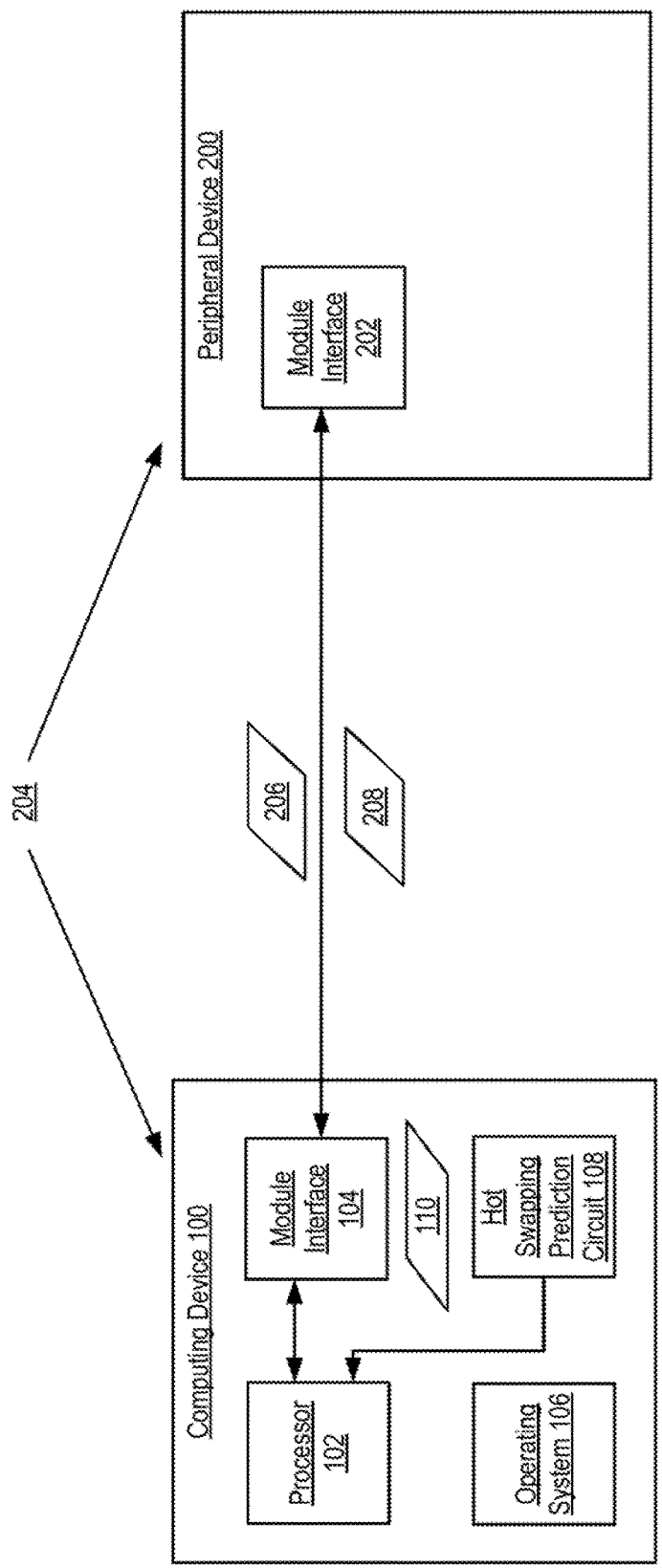
FIG. 2 illustrates a computing device to perform an operation with a coupled peripheral device in response to detecting a hot swapping prediction signal from a hot swapping prediction circuit, according to another example.

FIG. 2 illustrates computing device 100 to perform an operation with a coupled peripheral device 200 in response to detecting hot swapping prediction signal 110 from hot swapping prediction circuit 108, according to another example. Peripheral device 200 may include a module interface 202 that is similar to module interface 104. Computing device 100 may be coupled to peripheral device 200 via module interfaces 104 and 202. In an example. module interface 202 may be located on an upper side of peripheral device 200. Thus, when peripheral device 200 is coupled to computing device 100, peripheral device 200 may be located directly underneath computing device 100 to form a stacked configuration. The stacked configuration may enable multiple peripheral devices to be coupled to computing device 100 to form a modular computing system 204 while maintaining a compact form factor.

During operation, when modular computing system 204 is picked up by a user, hot swapping prediction circuit 108 may detect the physical movement of computing device 100 and generate hot swapping prediction signal 110. In response to detecting hot swapping prediction signal 110, processor 102 may perform an operation associated with peripheral device 200 via module interface 104.

In some examples, the operation may include a type of power operation associated with peripheral device 200. The type of power operation may include a first type of power operation where peripheral device 200 is to power off. The type of power operation may also include a second type of power operation where power provided to peripheral device 200 is reduced. Processor 102 may select the type of power operation to be performed based on a power consumption threshold of peripheral device 200, The power consumption threshold may indicate a minimum amount of power peripheral device 200 needed to function properly. When the power consumption threshold corresponds to an amount of power that has a high likelihood of causing sparks when peripheral device 200 is hot unplugged from computing device 100, processor 102 may perform the first type of power operation with peripheral device 200. When the power consumption threshold corresponds to an amount of power that has a low likelihood of causing sparks when peripheral device 200 is hot unplugged from computing device 100, processor 102 may perform the second type of power operation with peripheral device 200.

In some examples, processor 102 may also selectively perform a data operation associated with peripheral device 200 based on the function of peripheral device 200. For example, processor 102 may perform the data operation when peripheral device 200 is a data storage device or an optical disk, drive. The data operation may include a cache flushing operation when peripheral device 200 is a data storage device, such as a hard disk drive. The data operation may include an instruction to remove a read/write head of the hard disk drive from the hard disk drive platter. When peripheral device 200 is an optical disk drive, the data operation may include an instruction to remove a read/write head of the optical disk drive from an optical disk. Processor 102 may transmit a command 208 to peripheral device 200 to instruct peripheral device 200 to carry out the data operation via module interfaces 104 and 202.

Figure 3:
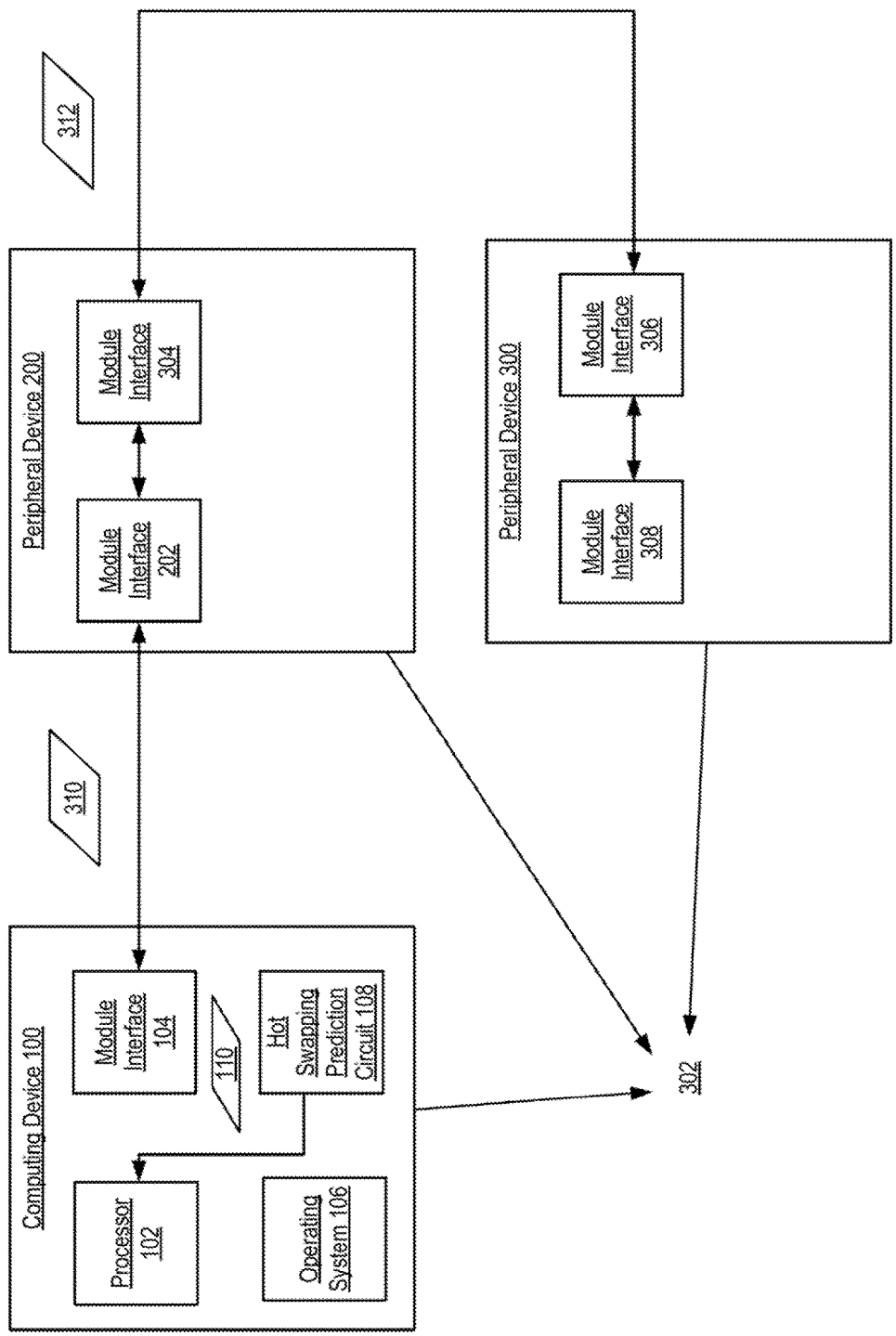
FIG. 3 illustrates a computing device to perform operations with a plurality of coupled peripheral devices in response to detecting a hot swapping prediction signal from a hot swapping prediction circuit, according to an example.

When there is a plurality of peripheral devices coupled to computing device 100, computing device 100 may perform a distinct operation on each coupled peripheral device, as described in more detail in FIG. 3.

FIG. 3 illustrates computing device 100 to perform operations with a plurality of coupled peripheral devices in response to detecting hot swapping prediction signal 100 from hot swapping prediction circuit 108, according to an example. A plurality of peripheral devices 200 and 300 may be coupled to computing device 100 in a stacked configuration to form a modular computing system 302.

Peripheral device 200 may be coupled to computing device and peripheral device 300 via module interface 202 and 304, respectively. Peripheral device 300 may be coupled to peripheral device 200 via a module interface 306 that is located at an upper side of peripheral device. Module interface 202 of peripheral device 200 may be coupled to module interface 104 of computing device 100. Module interface 304 may be coupled to module interface 306 of peripheral device 300. Module interface 304 may be located at a lower side of peripheral device 200 and module interface 202 may be located at the upper side of peripheral device 200. Module interfaces 202 and 304 may be connected so that power, data communication, and/or commands from computing device 100 may pass through peripheral device 200 to peripheral device 300.

During operation, when modular computing system 302 is picked up or moved, processor 102 may detect hot swapping prediction signal 110 as described in FIGS. 1-2. Processor 102 may change a parameter of a peripheral device detection operation as described in FIG. 1 as another peripheral device may be coupled to module computing system 302 at a module interface 308 of peripheral device 300. In addition or alternatively, processor 102 may transmit a command 310 to instruct peripheral device 200 to perform a cache flushing operation. Processor 102 may also transmit a command 312 to instruct peripheral device 300 to power off via peripheral device 200. Thus, processor 102 may instruct each coupled peripheral device to perform a distinct operation based on the function of the peripheral device and/or the power consumption threshold of the peripheral device.

Figure 4:
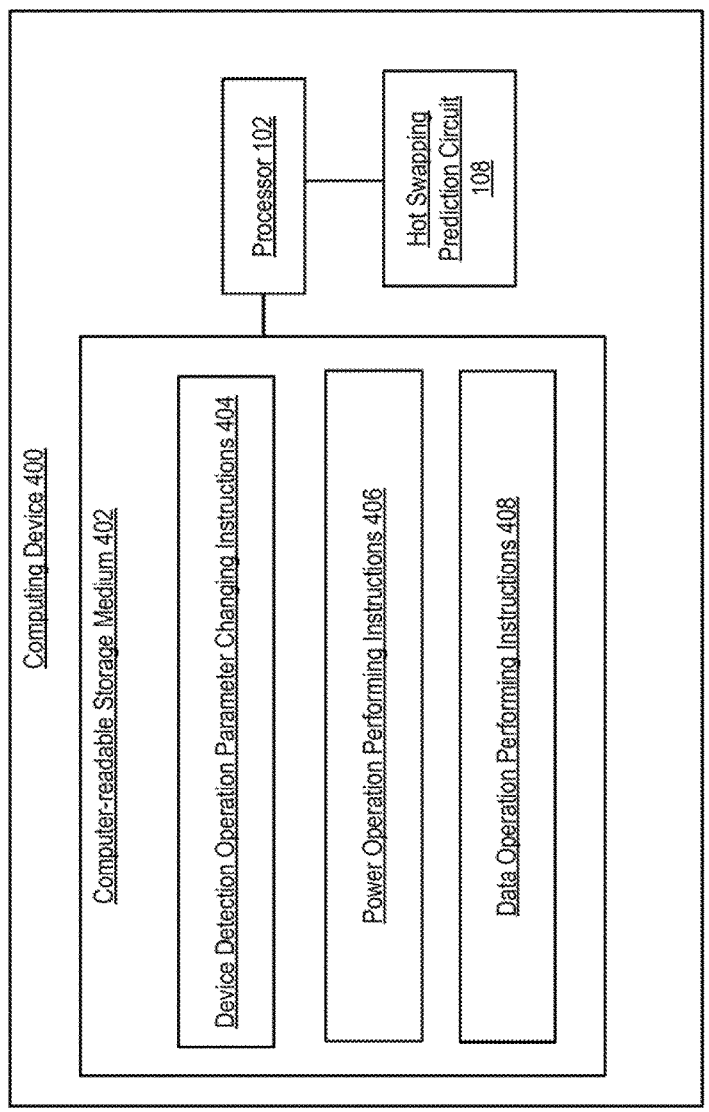
FIG. 4 illustrates a computing device to perform an operation with a coupled peripheral device in response to detecting a hot swapping prediction signal from a hot swapping prediction circuit, according to another example.

FIG. 4 illustrates a computing device 400 to perform an operation with a coupled peripheral device in response to detecting a hot swapping prediction signal from hot swapping prediction circuit 108, according to another example. Computing device 400 may be similar to computing device 100 of FIGS. 1-3. Computing device 400 may include processor 102, hot swapping prediction circuit 108, and a computer-readable storage medium 402.

Computer-readable storage medium 402 may be any electronic, magnetic, optical, or other physical storage device that contains or stores executable instructions. Thus, computer-readable storage medium 402 may be, for example, Random Access Memory (RAM), an Electrically Erasable Programmable Read-Only Memory (EEPROM), a storage device, an optical disc, etc. In some examples, computer-readable storage medium 402 may be a non-transitory storage medium, where the term "non-transitory" does not encompass transitory propagating signals. As described in detail below, computer-readable storage medium 402 may be encoded with a series of processor executable instructions 404, 406, and 408.

Device detection operation parameter changing instructions 404 may change a parameter of a device detection operation that is to be performed by an operating system of computing device 400. For example, referring to FIG. 1, in response to detecting hot swapping prediction signal 110, processor 102 may instruct operating system 106 to change a parameter of a device detection operation that is to be performed by operating system 106. Power operation performing instructions 406 may perform a power operation associated with a peripheral device coupled to computing device 400. For example, referring to FIG. 2, processor 102 may perform an operation associated with peripheral device 200 via module interface 104. In some examples, the operation may include a type of power operation associated with peripheral device 200. The type of power operation may include the first type of power operation and the second type of power operation. Data operation performing instructions 408 may perform a data operation associated with a peripheral device coupled to computing device 400. For example, referring to FIG. 2, processor 102 may perform the data operation when peripheral device 200 is a data storage device or an optical disk drive. The data operation may include a cache flushing operation when peripheral device 200 is a data storage device, such as a hard disk drive. The data operation may include an instruction to remove a read/write head of the hard disk drive from the hard disk drive platter.

The use of "comprising", "including" or "having" are synonymous and variations thereof herein are meant to be inclusive or open-ended and do not exclude additional unrecited elements or method steps.

What is claimed is:

1. A computing device comprising:
a module interface to communicate with a peripheral device;
a hot swapping prediction circuit to:
detect a physical movement of the computing device; and
generate a hot swapping prediction signal based on the detected physical movement; and
a processor coupled to the hot swapping circuit, wherein the processor is to, in response to detecting the hot swapping prediction signal from the hot swapping circuit, change a parameter of a peripheral device detection operation to be performed by an operating system of the computing device.

2. The computing device of claim 1, wherein the hot swapping circuit includes an accelerometer.

3. The computing device of claim 1, wherein the peripheral device detection operation includes discovering a power consumption threshold of the peripheral device and a function of the peripheral device.

4. The computing device of claim 1, wherein the change of the parameter includes the processor increasing an amount of attempts that the operating system is to undertake to discover information about the peripheral device before generating an error message.

5. The computing device of claim 1, wherein the module interface includes a universal serial bus (USB) type-c connector.

6. A computing device comprising:
a module interface to communicate with a peripheral device;
a hot swapping circuit to:
detect a physical movement of the computing device; and
generate a hot swapping prediction signal based on the detected physical movement; and
a processor coupled to the hot swapping circuit, wherein the processor is to:
in response to detecting the hot swapping prediction signal from the hot swapping circuit:
change a parameter of a peripheral device detection operation to be executed by an operating system of the computing device; and
perform a power operation associated with the peripheral device via the module interface.

7. The computing device of claim 6, wherein the peripheral device detection operation includes discovering a power consumption threshold of the peripheral device and a function of the peripheral device.

8. The computing device of claim 6, wherein the change of the parameter includes the processor increasing an amount of attempts that the operating system is to undertake to discover information about the peripheral device before generating an error message.

9. The computing device of claim 6, wherein the power operation includes reducing an amount of power provided to the peripheral device via the module interface.

10. The computing device of claim 6, wherein the power operation includes instructing the peripheral device to power off via the module interface.

11. A non-transitory computer-readable storage medium comprising instructions that when executed cause a processor of a computing device to:
in response to detecting a hot swapping prediction signal from a hot swapping circuit of the computing device:
change a parameter of a peripheral device detection operation to be performed by an operating system of the computing device;
perform a power operation associated with the peripheral device via a module interface of the computing device; and
perform a data operation associated with the peripheral device via the module interface when the peripheral device is a data storage device or an optical disk drive, wherein the hot swapping prediction signal is generated based on a physical movement of the computing device detected via the hot swapping prediction circuit.

12. The non-transitory computer-readable storage medium of claim 11, wherein the data operation includes instructing the peripheral device to perform a cache flushing operation.

13. The non-transitory computer-readable storage medium of claim 11, wherein the power operation includes a first type of power operation and a second type of power operation, and wherein the type of power operation to be performed is selected based on a power consumption threshold of the peripheral device.

14. The non-transitory computer-readable storage medium of claim 13, wherein the first type of power operation includes reducing an amount of power provided to the peripheral device via the module interface.

15. The non-transitory computer-readable storage medium of claim 14, wherein the second type of power operation includes instructing the peripheral device to power off via the module interface.

16. The non-transitory computer-readable storage medium of claim 11, wherein the change of the parameter includes the processor increasing an amount of attempts that the operating system is to undertake to discover information about the peripheral device before generating an error message.

* * * * *